US008364752B2

(12) United States Patent
Goodman et al.

(10) Patent No.: US 8,364,752 B2
(45) Date of Patent: Jan. 29, 2013

(54) DETERMINING AVAILABILITY BASED ON PERCENTAGE AVAILABLE

(75) Inventors: Brian D. Goodman, Brooklyn, NY (US); Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 13/030,835

(22) Filed: Feb. 18, 2011

(65) Prior Publication Data

US 2012/0215855 A1 Aug. 23, 2012

(51) Int. Cl.
G16F 15/16 (2006.01)
(52) U.S. Cl. ......... 709/203; 709/204; 709/205; 715/700
(58) Field of Classification Search .................. 709/203, 709/204, 205
See application file for complete search history.

(56) References Cited

U.S. PATENT DOCUMENTS

| | | | |
|---|---|---|---|
| 6,714,967 B1* | 3/2004 | Horvitz | 709/206 |
| 7,082,402 B2 | 7/2006 | Conmy et al. | |
| 7,395,221 B2 | 7/2008 | Doss et al. | |
| 7,644,144 B1* | 1/2010 | Horvitz et al. | 709/223 |
| 7,693,736 B1 | 4/2010 | Chu et al. | |
| 2007/0055669 A1 | 3/2007 | Murillo et al. | |
| 2008/0021760 A1 | 1/2008 | Doss et al. | |
| 2008/0033778 A1* | 2/2008 | Boss et al. | 705/9 |
| 2008/0228547 A1 | 9/2008 | Doss et al. | |
| 2009/0125365 A1 | 5/2009 | Masselle et al. | |
| 2009/0168609 A1 | 7/2009 | Weir et al. | |
| 2009/0172592 A1 | 7/2009 | Schirmer et al. | |
| 2010/0121665 A1 | 5/2010 | Boyer | |
| 2010/0211424 A1 | 8/2010 | Hill | |
| 2011/0289142 A1* | 11/2011 | Whalin et al. | 709/203 |
| 2012/0005278 A1* | 1/2012 | Muller et al. | 709/206 |
| 2012/0185259 A1* | 7/2012 | Roitman et al. | 705/1.1 |
| 2012/0215855 A1* | 8/2012 | Goodman et al. | 709/206 |

OTHER PUBLICATIONS

Berry-et al.; "Deploying a Personalized Time Management Agent"; ACM Digital Library; pp. 1564-1575; May 2006.
Faulring-et al.; "Availability Bars for Calendar Scheduling"; ACM Digital Library; pp. 760-772; Apr. 2006.
Walker-et al.; "Time Management for Busy People"; Google; Aug. 2006.
Tullio-et al.; "Augmenting Shared Personal Calendars"; ACM Digital Library; pp. 11-20; 2002.
Notification of Transmittal of the International Search Report and the Written Opinion of the International Searching Authority, or the Declaration, International Application No. PCT/US2012/025361, dated Apr. 25, 2012.

* cited by examiner

Primary Examiner — Michael Won
(74) Attorney, Agent, or Firm — Cahn & Samuels, LLP; Louis J. Percello, Esq.

(57) ABSTRACT

An embodiment of the invention provides a system and method for displaying the scheduling availability of a user. The system includes an occupancy module for analyzing the schedule of the user to determine the occupancy for a time period in the schedule. The time period includes an available time slot and/or an occupied time slot. A processor connected to the occupancy module determines whether the occupancy for the time period is above a threshold level of occupancy. The threshold level of occupancy includes a maximum number of occupied time slots, a maximum percentage of occupied time slots, a maximum amount of occupied time, and/or a maximum percentage of occupied time. A scheduling module connected to the processor automatically displays the scheduling availability of the user as unavailable for the time slot when the occupancy for the time period is above the threshold level of occupancy.

24 Claims, 9 Drawing Sheets

|  | Feb. 1, 2011 | Feb. 2, 2011 |
|---|---|---|
| 8:00 AM |  |  |
| 9:00 AM |  |  |
| 10:00 AM |  |  |
| 11:00 AM |  |  |
| 12:00 PM |  |  |
| 1:00 PM |  |  |
| 2:00 PM |  |  |
| 3:00 PM |  |  |
| 4:00 PM |  |  |
| 5:00 PM |  |  |

FIG. 4

| | Feb. 3, 2011 |
|---|---|
| 8:00 AM | ▓▓▓▓▓ |
| 9:00 AM | ▓▓▓▓▓ |
| 10:00 AM | |
| 11:00 AM | ▓▓▓▓▓ |
| 12:00 PM | ▓▓▓▓▓ |
| 1:00 PM | |
| 2:00 PM | ▓▓▓▓▓ |
| 3:00 PM | ▓▓▓▓▓ |
| 4:00 PM | ▓▓▓▓▓ |
| 5:00 PM | |

FIG. 5

DETERMINING AVAILABILITY BASED ON PERCENTAGE AVAILABLE

BACKGROUND

The present invention is in the field of systems, methods, and computer program products for determining availability based on percentage available.

With increased reliance on network-based work environments, software applications designed to enhance the efficiency and productivity of workers in that environment have evolved. One type of application that has emerged is referred to as an electronic calendar or personal information and time manager.

Lotus Organizer™ is one example of an electronic time manager for scheduling appointments. Organizer's multi-access, multi-user database format allows multiple users to share the same file for group calendaring, contact, and task management. Organizer's daybook-style user interface makes it easy to use.

SUMMARY OF THE INVENTION

An embodiment of the invention includes a system and method for displaying the scheduling availability of a user. The system includes an occupancy module for analyzing the schedule of the user to determine the occupancy for a time period in the schedule. The time period includes an available time slot and/or an occupied time slot. A processor connected to the occupancy module determines whether the occupancy for the time period is above a threshold level of occupancy. The threshold level of occupancy includes a maximum number of occupied time slots, a maximum percentage of occupied time slots, a maximum amount of occupied time, and/or a maximum percentage of occupied time. A scheduling module connected to the processor automatically displays the scheduling availability of the user as unavailable for the time slot when the occupancy for the time period is above the threshold level of occupancy.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 4 illustrates two 10 hour time periods from a user's calendar according to an embodiment of the invention;

FIG. 5 illustrates a 10 hour time period from a user's calendar according to an embodiment of the invention;

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides systems and methods for changing the advertised availability of a user based on the percentage of available time that is currently occupied or "booked". For example, for the given time period of a 9:00 AM to 5:00 PM workday, 80% of the user's time is booked. Instead of advertising the available slots for the user's workday, the system automatically marks the entire day as blocked. The schedule advertising rules can vary; and, the time period can be focused on a specific day, week, or month. Moreover, the threshold for determining if a time period is booked can be defined by the user or the system.

Figure 1:
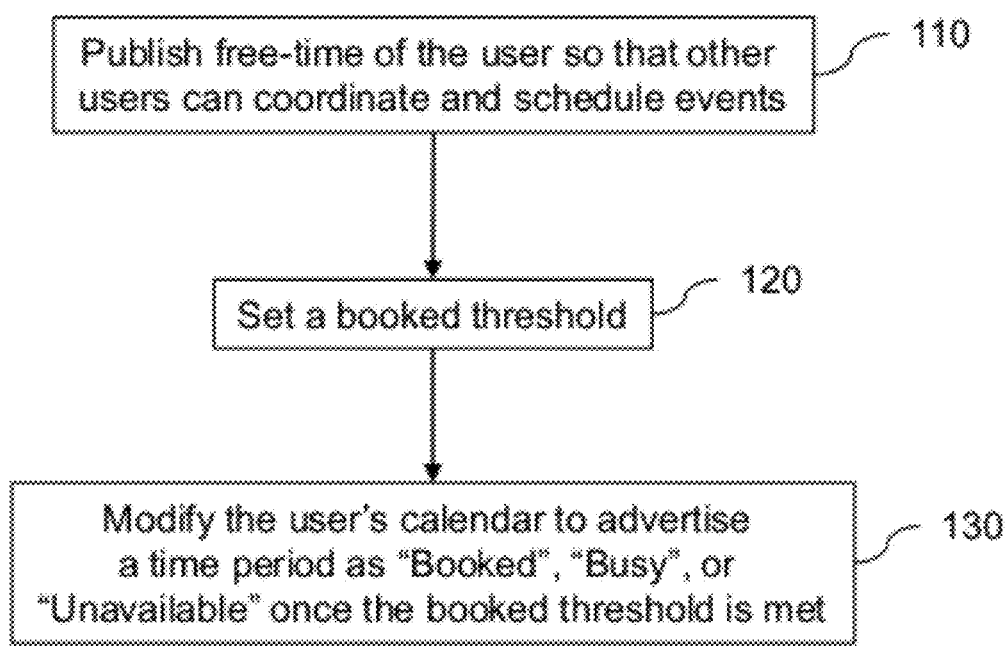
FIG. 1 is a flow diagram illustrating a method for determining availability based on the percentage available according to an embodiment of the invention.

FIG. 1 is a flow diagram illustrating a method for determining availability based on the percentage available according to an embodiment of the invention. An electronic calendaring system publishes free-time of the user so that other users (also referred to herein as "second users" (e.g., coworkers, friends, family members)) can coordinate and schedule events (e.g., meetings, social gatherings, meals) 110. The available free time can be published as a static record or can be updated via a dynamic query of the user's calendar.

A booked threshold is set (e.g., by the user or system) 120 that automatically changes the published free-time once the threshold is met. More specifically, in at least one embodiment of the invention, the booked threshold (also referred to herein as the "threshold level of occupancy") includes the maximum number of scheduled events per time period (also referred to herein as occupied time slots), the maximum number of hours booked per time period, the maximum percentage of scheduled events relative to free-time per time period, and/or the maximum percentage of hours booked per time period.

Once the threshold is met, the user's calendar is modified to automatically publish or advertise a time period as: "Booked", "Busy", or "Unavailable" based on the booked threshold 130.

In at least one embodiment of the invention, only the user is able to see free time on the calendar once the booked threshold has been met. This helps ensure that the others can manage their own calendars and that the user understands his or her realistic availability. If a scheduled event is cancelled or rescheduled, which results in the booked threshold no longer being met, then the advertised free-time on the user's calendar will adjust accordingly.

The following description provides an example of the methods and systems in use according to an embodiment of the invention. Bob's calendar currently shows him as unavailable from 9:00 AM to 5:00 PM during every hour time slot with the exception of 4:00 PM to 5:00 PM. Without the methods and systems of the embodiments herein, Susie could book a meeting during the 4:00 PM to 5:00 PM time slot. Thus, Bob would be in meetings the entire day. However, using the methods and systems herein, Bob sets the maximum number of booked hours to be nine. Since nine hours are already booked, when Susie goes to view Bob's calendar it will appear to be busy or otherwise displayed as not being available for a possible meeting time.

Figure 2:
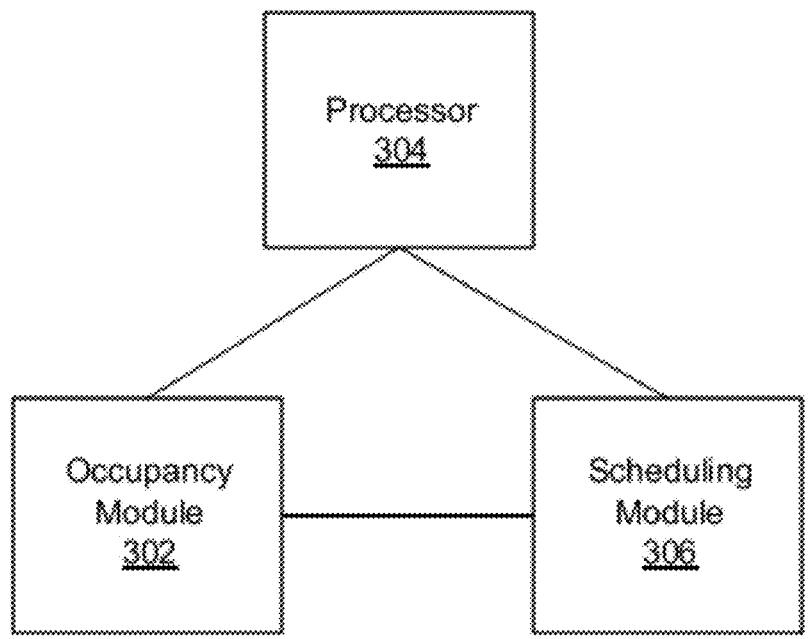
FIG. 2 illustrates a system for displaying scheduling availability of a user according to an embodiment of the invention.
Figure 3:
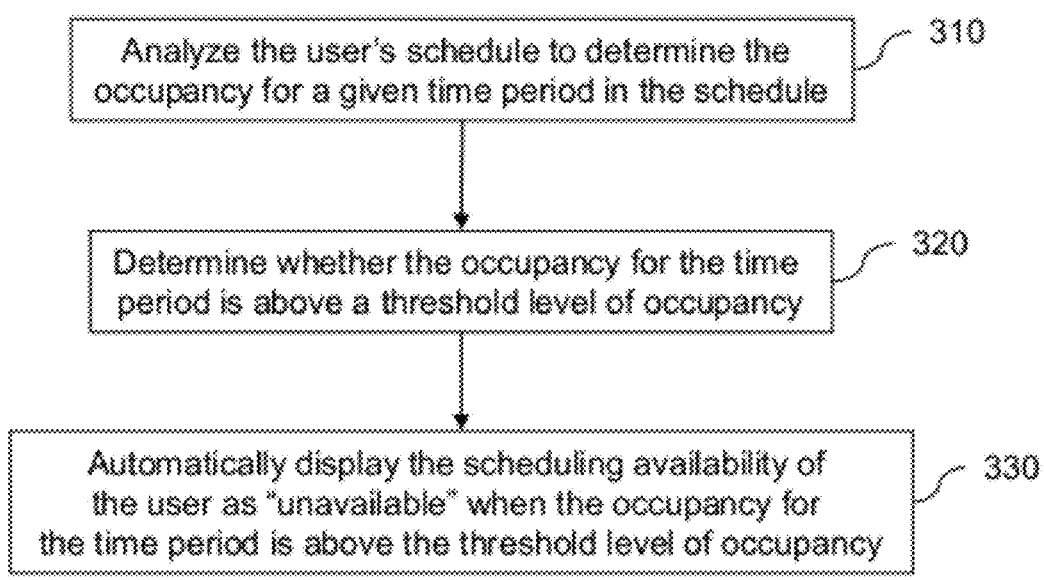
FIG. 3 is a flow diagram illustrating a method for displaying scheduling availability of a user according to an embodiment of the invention.

FIG. 2 illustrates a system for displaying the scheduling availability of a user (e.g., the user's availability to attend a meeting during a given day) according to an embodiment of the invention. FIG. 3 is a flow diagram illustrating a method for displaying scheduling availability of a user according to an embodiment of the invention, for example, using the system. As used herein, the term "user" includes an individual or group of individuals (e.g., individuals grouped by department or team). The system includes an occupancy module 302, a processor 304 connected to the occupancy module 302, and a scheduling module 306 connected to the processor 304.

The occupancy module 302 analyzes the user's schedule to determine the occupancy for a given time period in the schedule (i.e., the user's availability) 310. The "time period" represents a day, a week, a month, a morning, an afternoon, an evening, and/or a defined block of time (e.g., 5:00-7:00 PM, Monday-Wednesday, Tuesday and Thursday) in the user's calendar. The time period includes one or more available time slots (i.e., not booked) and/or occupied time slots (i.e., booked). The occupancy module 302 determines the occupancy based on the number of occupied time slots in the time period, the percentage of occupied time slots in the time period, the amount of occupied time in the time period, and/or the percentage of occupied time in the time period.

Thus, for example, FIG. 4 illustrates a user's calendar for the time periods Feb. 1, 2011 (8:00 AM-6:00 PM) and Feb. 2, 2011 (8:00 AM-6:00 PM). In at least one embodiment, the time period is divided into one hour time slots. Thus, for example, the occupancy module 302 determines that the occupancy for the Feb. 1, 2011 time period is: 4 occupied time slots, 40% occupied time slots, 4 hours of occupied time, and 40% of occupied time. In another embodiment, the time period is divided into smaller time slots, e.g., 10 minute time slots, or 30 minute time slots. In yet another embodiment, the time period is not divided into smaller time slots. Thus, for example, the occupancy module 302 determines that the occupancy for the Feb. 2, 2011 time period is: 2 occupied time slots, 67% occupied time slots, 9 hours of occupied time, and 90% of occupied time.

In at least one embodiment of the invention, the occupancy module 302 observes one or more ineligible occupied time slots that are not included in the number of occupied time slots in the time period, the percentage of occupied time slots in the time period, the amount of occupied time in the time period, and/or the percentage of occupied time in the time period. Examples of ineligible occupied time slots include meal breaks, work breaks, errands, and other personal activities. Ineligible occupied time slots are defined by the user and/or administrator of the system. Thus, for example, if the user defines that 12:00 PM-1:00 PM is an ineligible occupied time slot in the Feb. 2, 2011 time period, then the occupancy module 302 determines that the occupancy is: 3 occupied time slots, 75% occupied time slots, 8 hours of occupied time, and 89% of occupied time. The occupancy module 302 updates the occupancy for the time period when a change to the user's schedule is detected.

The processor 304 determines whether the occupancy for the time period is above a threshold level of occupancy 320. The threshold level of occupancy includes a maximum number of occupied time slots, a maximum percentage of occupied time slots, a maximum amount of occupied time, and/or a maximum percentage of occupied time.

The following examples make reference to the exemplary time period illustrated in FIG. 5, wherein the time period of 8:00 AM-6:00 PM Feb. 3, 2011 is divided into one hour time slots, and wherein there are no ineligible occupied time slots. Thus, the threshold level of occupancy is exceeded in the Feb. 3, 2011 time period if the threshold level of occupancy is: a maximum of 6 occupied time slots, a maximum of 60% of occupied time slots, a maximum of 6 hours occupied time, and/or a maximum of 60% of occupied time.

The scheduling module 306 automatically displays the scheduling availability of the user, wherein the scheduling availability of the user is displayed as "unavailable" for the time slot when the occupancy for the time period is above the threshold level of occupancy 330. Thus, in the Feb. 3, 2011 time period example above, the user's scheduling availability is published as "unavailable" even though there are 3 one hour time slots that are not occupied (i.e., booked). In at least one embodiment of the invention, the scheduling module 306 sends a message (e.g., email, facsimile, instant message, pre-recorded telephone call) to the user and/or a second user, wherein the message indicates that the scheduling availability of the user is "unavailable".

As discussed above, the occupancy module 302 updates the occupancy for the time period when a change to the user's schedule is detected. Thus, in at least one embodiment, when a change to the user's schedule is detected that modifies the user's occupancy for the time period such that it exceeds the threshold level of occupancy, the scheduling module 306 sends the message to the user and/or a second user. Similarly, in another embodiment, when a change to the user's schedule is detected that modifies the user's occupancy for the time period such that it does not exceed the threshold level of occupancy, the scheduling module 306 sends a second message indicating "availability" to the user and/or a second user if message indicating that the scheduling availability of the user is "unavailable" was previously sent. In yet another embodiment, the user has the option to override the automatic display of his or her scheduling availability (e.g., after the user receives the message and/or second message). Thus, for example, a user can choose to have his scheduling availability displayed as "available" even though the threshold level of occupancy is exceeded.

In at least one embodiment of the invention, the scheduling module and threshold are deployed as part of a process environment wherein the combination of module and threshold is process software executing as part of a larger flow. Specifically, a process server has a flow by which scheduling an event with multiple parties is one step. At this step, the process server uses the scheduling module with a threshold, such as only show available times where attendees have at least 50% availability (e.g., 50% of the attendees are available, or time slots on days where all attendees have at least 50% of the day available). The process server executing a process flow then manages the event scheduling in a more explicit manner. In another embodiment, the attendees' threshold settings are used, which results in a schedule optimized for the individual and not the process server process. In either of these cases, the scheduling module could be a module containing all of the required elements to perform the task, or a module that calls a service where the required elements are managed.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server and then it will be stored on the proxy server.

Figure 6:
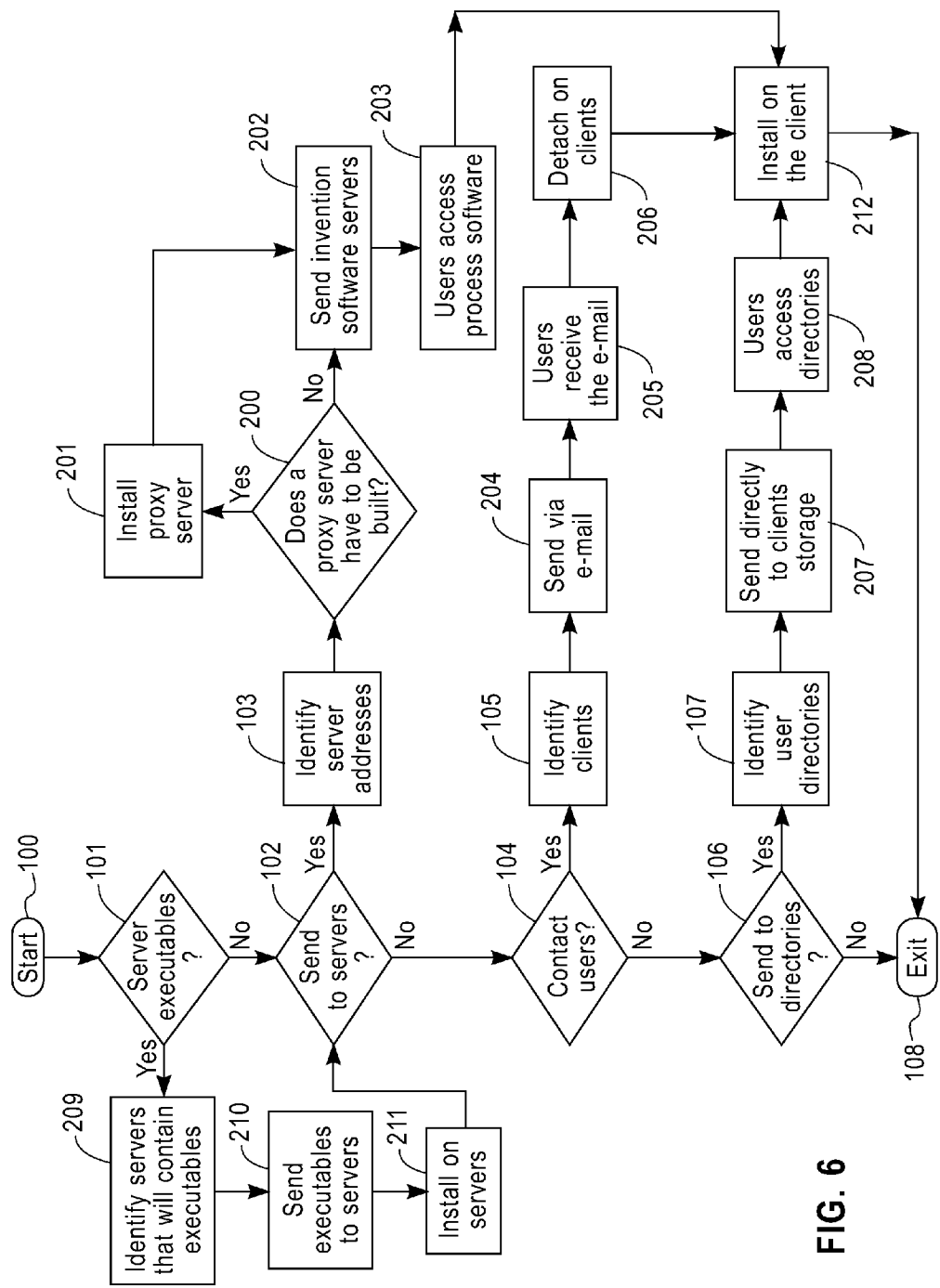
FIG. 6 illustrates a system and method for deployment according to an embodiment of the invention.

FIG. 6 illustrates a system and method for deployment according to an embodiment of the invention. Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via email to each of the users' client computers. The users then receive the e-mail 205 and then detach the process software from the e-mail to a directory on their client computers 206. The user executes the program that installs the process software on his client computer 212 then exits the process 108.

Lastly a determination is made on whether the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP).

The users access the directories on their client file systems in preparation for installing the process software 208. The user executes the program that installs the process software on his client computer 212 then exits the process 108.

The process software which consists of, for example, a scheduling module and a threshold, is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7:
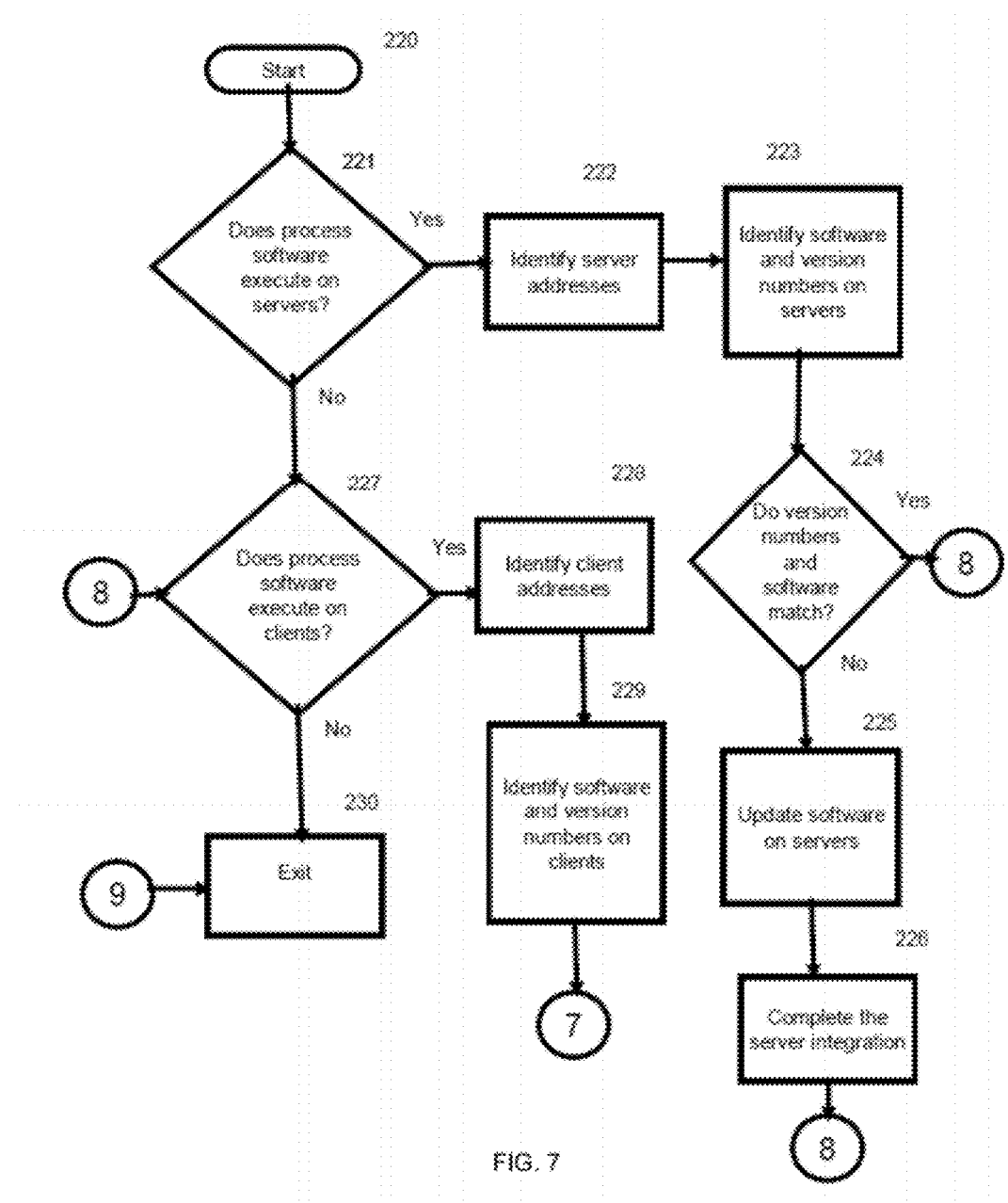
FIGS. 7 and 8 illustrate a system and method for integration according to an embodiment of the invention.
Figure 8:
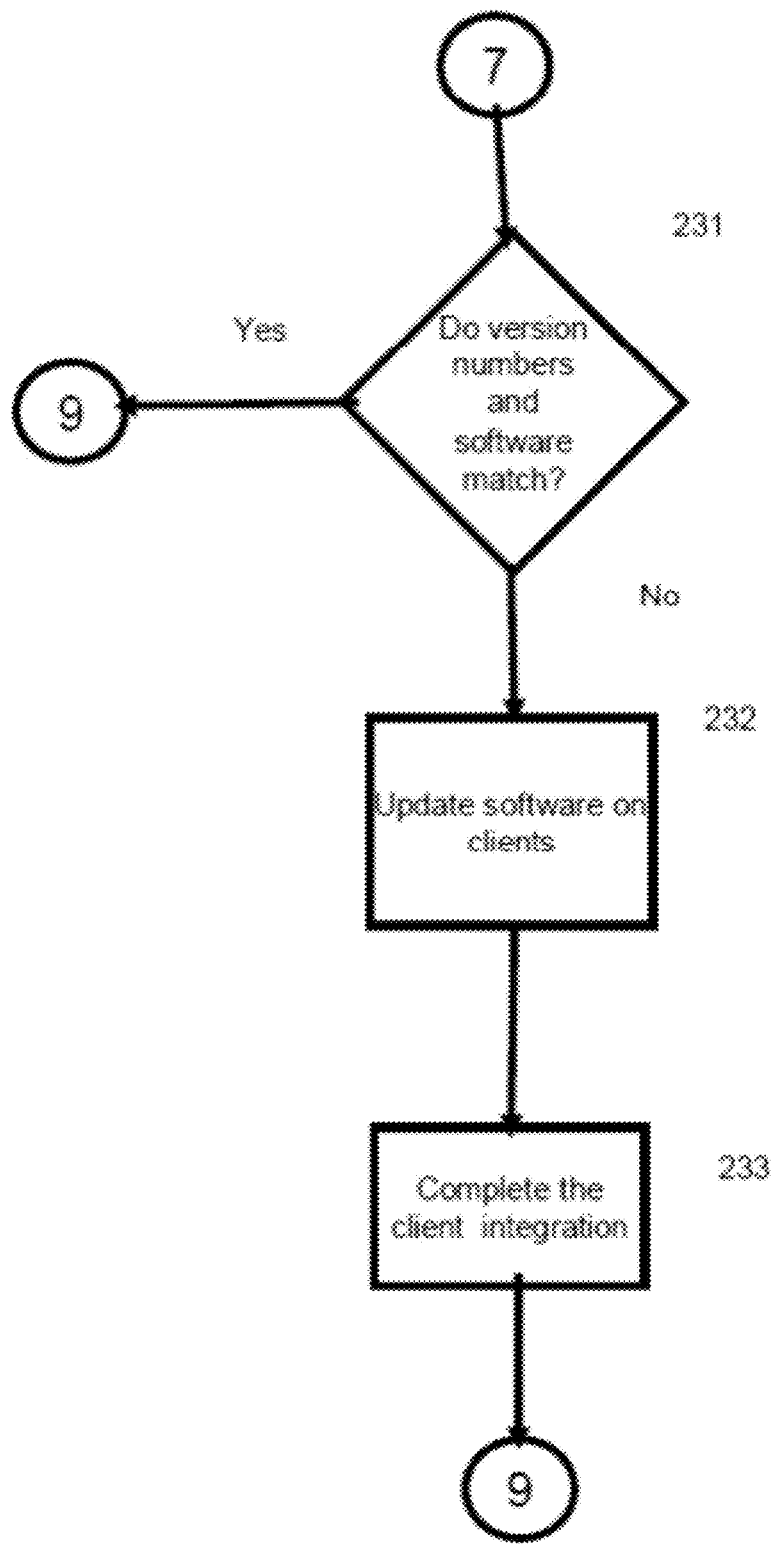

FIGS. 7 and 8 illustrate a system and method for integration according to an embodiment of the invention. Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers that have been tested with the process software 229. The clients are also checked to determine if there is any missing software that is required by the process software 229.

A determination is made is the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated or installed on the clients 232. The client integration is completed by installing the process software on the clients 233. The integration proceeds to 230 and exits.

The process software (e.g., a scheduling module and a threshold) is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9:
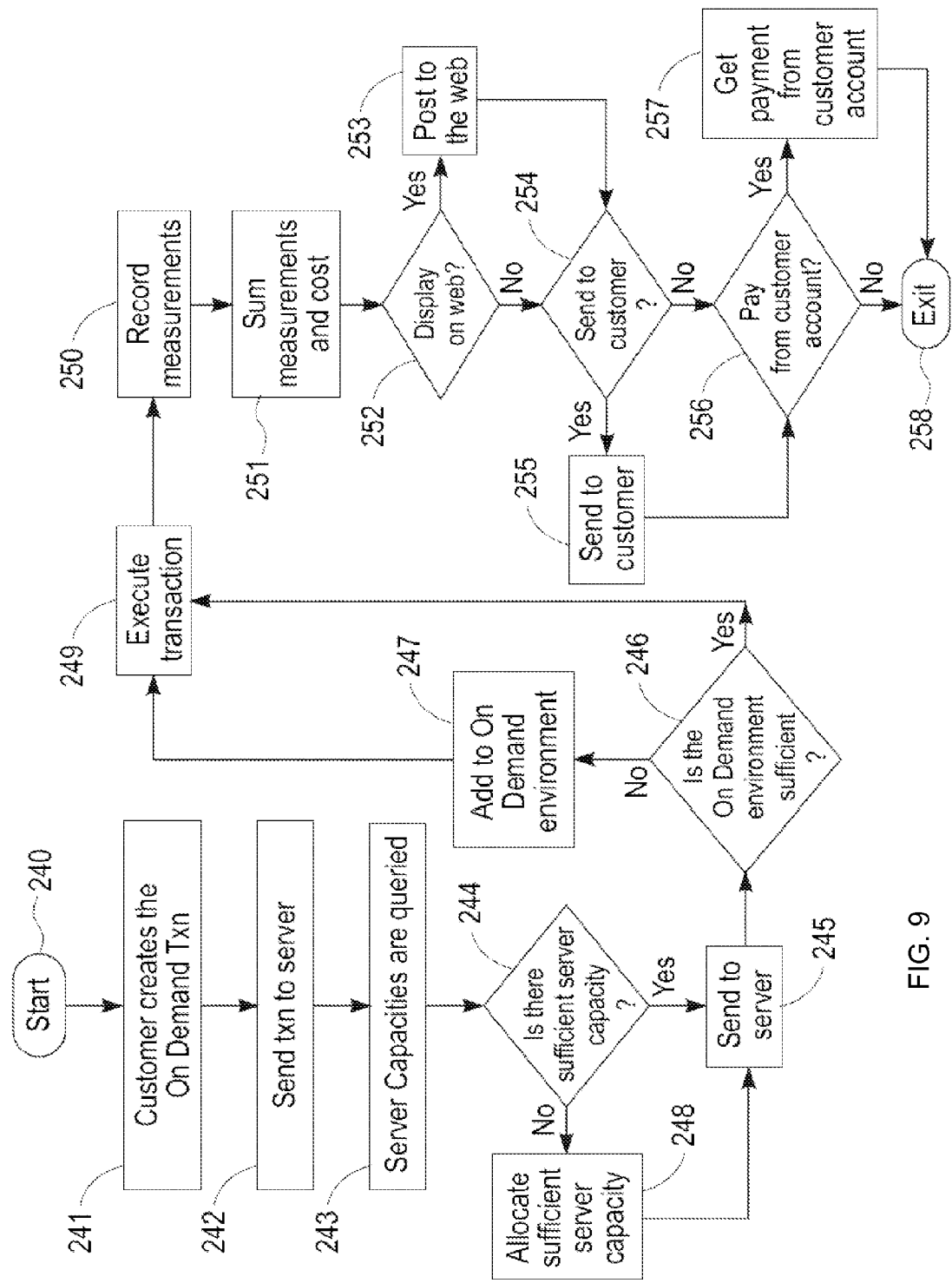
FIG. 9 illustrates a system and method for on demand according to an embodiment of the invention.

FIG. 9 illustrates a system and method for on demand according to an embodiment of the invention. Step 240 begins the On Demand process. A transaction is created than contains the unique customer identification, the requested service type and any service parameters that further specify the type of service 241. The transaction is then sent to the main server 242. In an On Demand environment the main server can initially be the only server, and then as capacity is consumed other servers are added to the On Demand environment.

The server central processing unit (CPU) capacities in the On Demand environment are queried 243. The CPU requirement of the transaction is estimated, then the server's available CPU capacity in the On Demand environment is compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, and then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251.

If the customer has requested that the On Demand costs be posted to a web site 252 then they are posted 253. If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
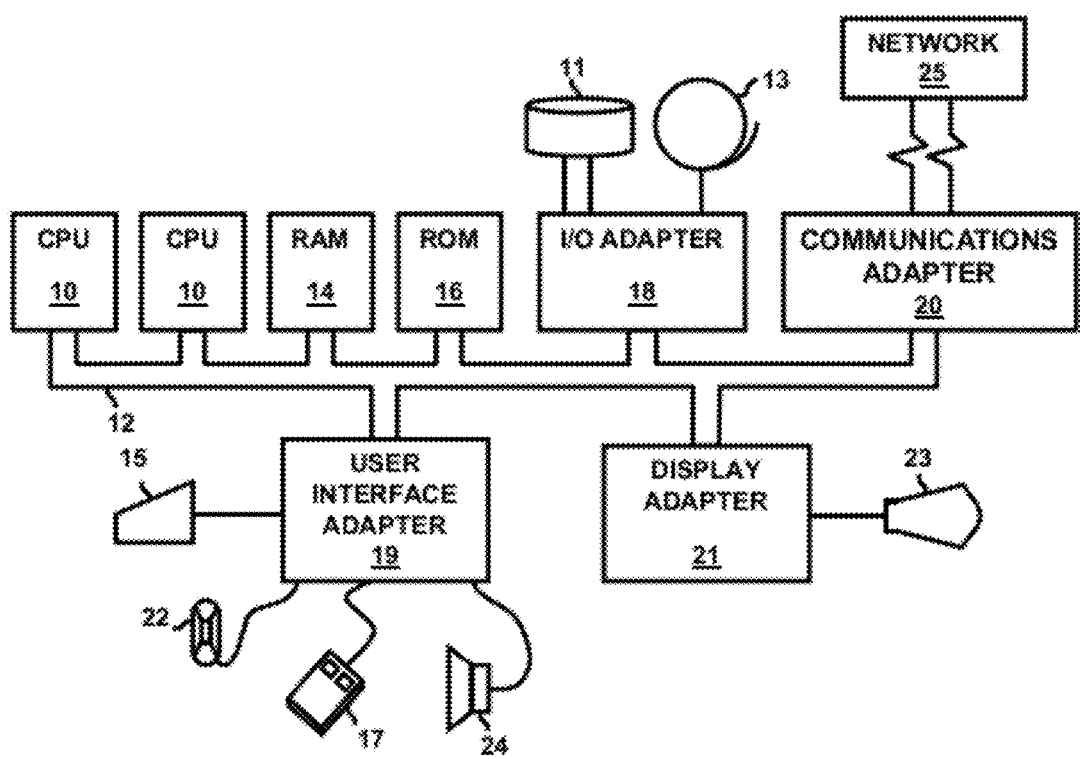
FIG. 10 illustrates a computer program product according to an embodiment of the invention.

Referring now to FIG. 10, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for displaying scheduling availability of a user, said method comprising:
    analyzing a schedule of the user with an occupancy module to determine occupancy for a time period in the schedule, the time period including at least one of an available time slot and an occupied time slot;
    determining whether the occupancy for the time period is above a threshold level of occupancy with a processor, the threshold level of occupancy including at least one of:
    a maximum number of occupied time slots,
    a maximum percentage of occupied time slots,
    a maximum amount of occupied time, and
    a maximum percentage of occupied time; and
    automatically displaying the scheduling availability of the user with a scheduling module, the scheduling availability of the user being displayed as unavailable for the time slot when the occupancy for the time period is above the threshold level of occupancy.

2. The method according to claim 1, wherein the time period includes at least one of a day, a week, a month, a morning, an afternoon, an evening, and a defined block of time.

3. The method according to claim 1, wherein the occupancy for the time period is based on at least one of:
    number of occupied time slots in the time period,
    percentage of occupied time slots in the time period,
    amount of occupied time in the time period, and
    percentage of occupied time in the time period.

4. The method according to claim 3, further including defining at least one ineligible occupied time slot that is not included in at least one of:
    the number of occupied time slots in the time period,
    the percentage of occupied time slots in the time period,
    the amount of occupied time in the time period, and
    the percentage of occupied time in the time period.

5. The method according to claim 1, further including updating the occupancy for the time period when a change to the schedule of the user is detected.

6. The method according to claim 1, wherein the threshold level of occupancy includes a maximum number of occupied time slots.

7. The method according to claim 1, wherein the threshold level of occupancy includes a maximum percentage of occupied time slots.

8. The method according to claim 1, wherein the threshold level of occupancy includes a maximum amount of occupied time.

9. The method according to claim 1, wherein the threshold level of occupancy includes a maximum percentage of occupied time.

10. The method according to claim 1, wherein said automatically displaying of the scheduling availability of the user includes sending a message at least one of the user and a second user.

11. A computer implemented method for displaying scheduling availability of a user, said method comprising:
    analyzing a schedule of the user with an occupancy module to determine occupancy for a time period in the schedule, the time period including at least one of an available time slot and an occupied time slot;
    determining whether the occupancy for the time period is above a threshold level of occupancy with a processor, the threshold level of occupancy including at least one of:
    a maximum number of occupied time slots,
    a maximum percentage of occupied time slots,
    a maximum amount of occupied time, and
    a maximum percentage of occupied time; and
    automatically displaying the scheduling availability of the user with a scheduling module, the scheduling availability of the user being displayed as unavailable for the time slot when the occupancy for the time period is above the threshold level of occupancy.

12. The method according to claim 11, wherein the time period includes at least one of a day, a week, a month, a morning, an afternoon, an evening, and a defined block of time.

13. The method according to claim 12, wherein the occupancy for the time period is based on at least one of:
    number of occupied time slots in the time period,
    percentage of occupied time slots in the time period,
    amount of occupied time in the time period, and
    percentage of occupied time in the time period.

14. The method according to claim 13, further including defining at least one ineligible occupied time slot that is not included in at least one of:
    the number of occupied time slots in the time period,
    the percentage of occupied time slots in the time period,
    the amount of occupied time in the time period, and
    the percentage of occupied time in the time period.

15. The method according to claim 11, further including updating the occupancy for the time period when a change to the schedule of the user is detected.

16. The method according to claim 11, wherein said automatically displaying of the scheduling availability of the user includes sending a message to at least one of the user and a second user.

17. A system for displaying scheduling availability of a user, said system comprising:
    an occupancy module for analyzing a schedule of the user to determine occupancy for a time period in the schedule, the time period including at least one of an available time slot and an occupied time slot;
    a processor connected to said occupancy module, said processor determines whether the occupancy for the time period is above a threshold level of occupancy, the threshold level of occupancy including at least one of:
    a maximum number of occupied time slots,
    a maximum percentage of occupied time slots,
    a maximum amount of occupied time, and
    a maximum percentage of occupied time; and a scheduling module connected to said processor, said scheduling module automatically displays the scheduling availability of the user, the scheduling availability of the user being displayed as unavailable for the time slot when the occupancy for the time period is above the threshold level of occupancy.

18. The system according to claim 17, wherein said occupancy module determines the occupancy for the time period based on at least one of:
   number of occupied time slots in the time period,
   percentage of occupied time slots in the time period,
   amount of occupied time in the time period, and
   percentage of occupied time in the time period.

19. The system according to claim 18, wherein said occupancy module observes at least one ineligible occupied time slot, the ineligible occupied time slot being excluded from at least one of:
   the number of occupied time slots in the time period,
   the percentage of occupied time slots in the time period,
   the amount of occupied time in the time period, and
   the percentage of occupied time in the time period.

20. The system according to claim 17, wherein the threshold level of occupancy includes a maximum number of occupied time slots.

21. The system according to claim 17, wherein the threshold level of occupancy includes a maximum percentage of occupied time slots.

22. The system according to claim 17, wherein the threshold level of occupancy includes a maximum amount of occupied time.

23. The system according to claim 17, wherein said scheduling module sends a message to at least one of the user and a second user, the message including the scheduling availability of the user.

24. A non-transitory computer program product when executed by a processor for displaying scheduling availability of a user, said non-transitory computer program product including:
   a non-transitory computer readable storage medium;
   first program instructions to analyze a schedule of the user with an occupancy module to determine occupancy for a time period in the schedule, the time period including at least one of an available time slot and an occupied time slot;
   second program instructions to determine whether the occupancy for the time period is above a threshold level of occupancy with a processor, the threshold level of occupancy including at least one of:
   a maximum number of occupied time slots,
   a maximum percentage of occupied time slots,
   a maximum amount of occupied time, and
   a maximum percentage of occupied time; and
   third program instructions to automatically display the scheduling availability of the user with a scheduling module, the scheduling availability of the user being displayed as unavailable for the time slot when the occupancy for the time period is above the threshold level of occupancy, said first program instructions, said second program instructions, and said third program instructions are stored on said computer readable storage medium.

* * * * *